(12) United States Patent
Corbridge

(10) Patent No.: US 8,730,200 B2
(45) Date of Patent: May 20, 2014

(54) TOUCH-SCREEN PANEL COMPRISING CELLS THAT HAVE HOLED OR DUMMIED INTERIOR PORTIONS

(75) Inventor: Mark Corbridge, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 12/876,102

(22) Filed: Sep. 3, 2010

(65) Prior Publication Data

US 2012/0056820 A1     Mar. 8, 2012

(51) Int. Cl.
*G06F 3/045* (2006.01)

(52) U.S. Cl.
USPC .................................. 345/174; 178/18.06

(58) Field of Classification Search
USPC ................... 345/173–178; 178/18.01–20.04
See application file for complete search history.

(56) References Cited

U.S. PATENT DOCUMENTS

| | | | | |
|---|---|---|---|---|
| 7,196,281 | B2 * | 3/2007 | Cok et al. ...................... | 200/512 |
| 7,755,711 | B2 * | 7/2010 | Kenmochi et al. .............. | 349/48 |
| 2009/0284454 | A1 * | 11/2009 | Kwon et al. .................... | 345/82 |
| 2011/0007020 | A1 * | 1/2011 | Hong et al. .................... | 345/174 |
| 2011/0018829 | A1 * | 1/2011 | Peng ............................. | 345/173 |
| 2011/0115718 | A1 * | 5/2011 | Hsieh et al. .................... | 345/173 |

* cited by examiner

*Primary Examiner* — Abbas Abdulselam
*Assistant Examiner* — Gerald Oliver
(74) *Attorney, Agent, or Firm* — Mahamedi Paradice Kreisman LLP

(57) ABSTRACT

A touch-sensitive panel is provided for a display assembly and computing device. Individual cells of the panel are structured to include electrically inactive interior portions or centers to enhance the sensitivity and performance of the panel.

20 Claims, 4 Drawing Sheets

TOUCH-SCREEN PANEL COMPRISING CELLS THAT HAVE HOLED OR DUMMIED INTERIOR PORTIONS

TECHNICAL FIELD

The disclosed embodiments relate to a display assembly for computing devices, and more specifically, to construction of a touch-screen panel for a computing device.

BACKGROUND

Computing devices increasingly rely on touch-sensitive display surfaces for user interface features and functionality. Typically, touch sensitive displays use capacitance associated with human skin in order to detect contact by the user at a particular location on the display surface. Users can use their fingers to tap virtual keys, buttons and enter other commands. In many cases, devices that use touch-sensitive screens can dedicate more of the device's 'real-estate' to being a display surface, as such devices do not need as many mechanical interfaces such as keys and keyboards. The number of devices with touch-sensitive screens has increased recently, with greater incorporation of such displays in 'smart phones', tablets or slate devices, and touch-interactive computer screens.

DETAILED DESCRIPTION

Figure 1:
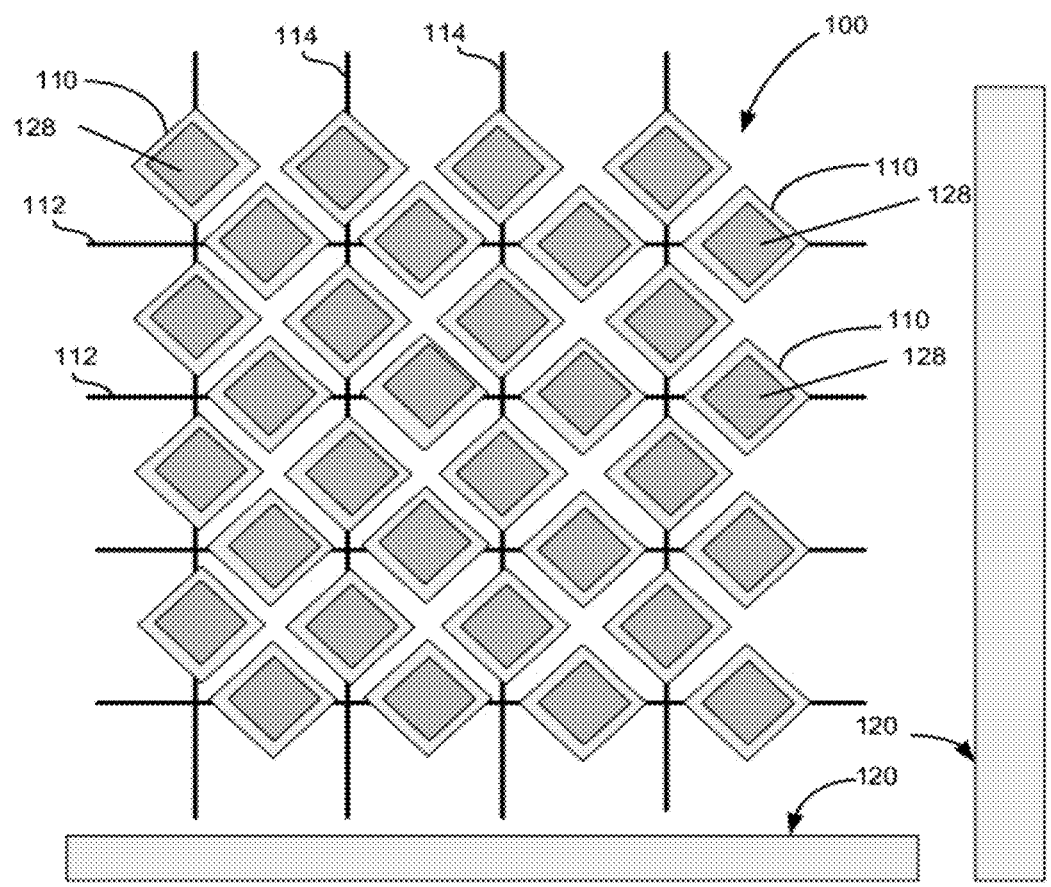
FIG. 1 illustrates an example touch screen panel that comprises cells that have holed or dummied interior portions, according to one or more embodiments.

Embodiments described herein include a touch-sensitive panel for a display assembly and computing device. Individual cells of the panel are structured to include electrically inactive interior portions or centers to enhance the sensitivity and performance of the panel.

Still further, embodiments described herein include a display assembly having a touch-sensitive panel that includes an array of sensor cells. The array of sensor cells includes a first group that is designated as driver cells, and a second group that is designated as receiver cells. The display assembly includes display hardware that is connected to the panel. The display hardware is structured to (i) actively drive a signal on each driver cell; and (ii) detect, on each receiver cell, a parasitic signal that is generated from the signal driven one or more driver cells that are adjacent to that receiver cell. At least one of the driver cells and the receiver cells are constructed to include a conductive perimeter thickness that surrounds a non-electrically active interior portion.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or may alternatively be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of systems provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

FIG. 1 illustrates a touch screen panel that comprises cells that have holed or dummied interior portions, according to one or more embodiments. A touch screen panel 100 is comprised of a grid of cells 110 that are arranged in a particular geometric configuration. As will be described, the individual cells 110 include reduced interior portions 128 that enhance sensitivity of the panel as a whole to human contact.

In FIG. 1, the particular geometric configuration shown includes diamond shaped cells 110 that are individually connected to one or two adjacent cells along one of a row 112 or column 114. The cells that comprise the panel 100 are divided as being either transmitters or detectors. In the configuration shown, the column-connected cells 114 are transmitters, and the row-connected cells 112 are detectors. The display hardware 120 actively drives a signal that is carried on the column-connected cells 114. The display hardware 120 also includes detectors (e.g. circuitry) that detect a resulting parasitic signal on the row-connected cells 112 as a result of the proximity of the individual detector cells to a neighboring transmitter cell. In the absence of a disruptive event (e.g. human skin contact), the generated parasitic signal provides a baseline for comparison to disruptions caused by subsequent contact by human skin (which has inherent capacitance).

While an embodiment of FIG. 1 illustrates diamond shaped cells 110, other embodiments and implementations may vary the shape of some or all of the cells. For example, cells 110 may be square, rectangular, triangular or polygon. Likewise, the arrangement by which transmitter/detector cells are separated into column-connected or row-connected cells can also vary. For example, some configurations may interconnect the transmitter/detector cells in both columns and rows, or alternatively, in non-row or column fashion.

Figure 3A:
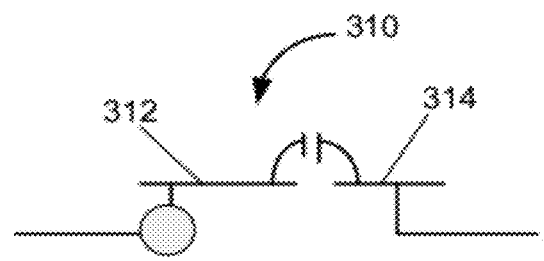
FIG. 3A and FIG. 3B illustrate (not to scale) the affects of capacitance from human contact on adjacent transmitter/detector cells of a touch screen that is structured in accordance with embodiments described herein.
Figure 3B:
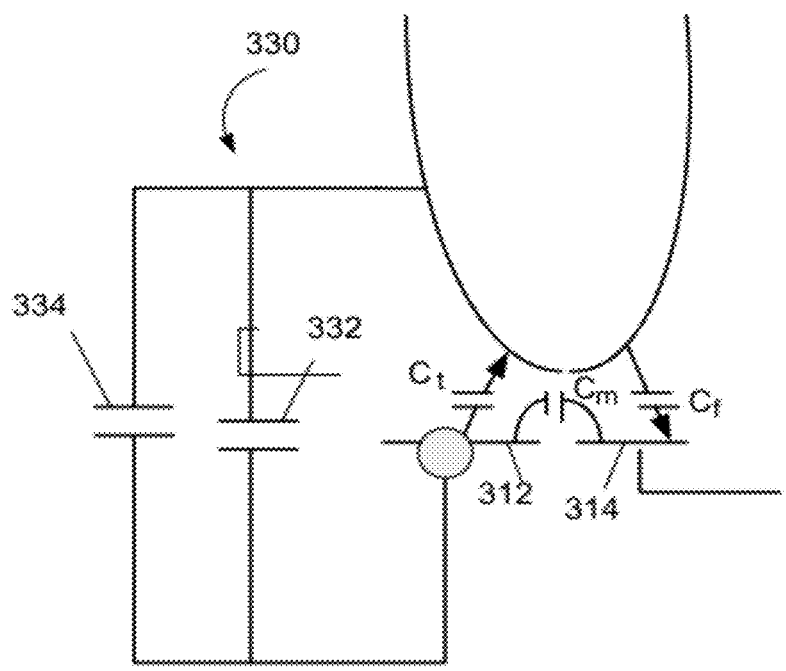

Generally, in the operation of a capacitive touch panel, when human skin is brought sufficiently close to a cluster of row connected detector cells 112, the baseline signal carried by those clusters of cells is disrupted. More specifically, as illustrated by FIG. 3A and FIG. 3B, the level of the baseline signal is reduced as a result of the capacitance in human skin. The capacitance diverts charge from the affected detector cells, resulting in the lower baseline signal. The detectors in the hardware 120 are able to detect a drop in the baseline signal, as well as the approximate location of the cells that were affected, so that hardware 120 is able to detect both the presence of human skin (e.g. touch input from user) and its location on the panel 100.

In many applications, a tighter or closer arrangement of cells enables a touch-sensitive display screen that is reduced in dimension without reduction in sensitivity. However, as illustrated by FIG. 3B, human contact over an array of cells has two opposing effects: (i) the finger (or skin) increases capacitance $C_f$ and $C_t$ in the array (and in the transmitter cells) which results in an increase of charge transferred to the detector cells; and (ii) the finger diverts charge $C_m$ that is present between individual pairs of transmitter/detector cells, thus reducing the level of the baseline signal. In an operational environment, embodiments recognize that diversion of charge $C_m$ should follow a circuit path that requires a path to ground that includes the body and environmental capacitance 332, 334. The formation of such a circuit path, however, may be hampered if, for example, poor conditions exist to promote the path to ground (e.g. loose grip by user). Also if capacitances 332, 334 are too small at the instant of the user's finger contact, the effect may be that not enough charge $C_m$, is diverted. As a result, the increased capacitance to $C_f$ and $C_t$ (as a result of the finger presence) will cause the output charge in the detector cell 314 to be increased. As a result, the level of the baseline signal may not change, or it may change in a manner that is either not detectable to display hardware 120, or does not carry sufficient signal differentiation to convey a disruption that correlates to the presence of human skin.

To counter the increase of charge ($C_f$) resulting from the finger or skin contact, embodiments provide for removing a portion of an interior of the individual cells 110. Removing the portion of the interior of the individual cells results in the individual cells having a decreased area, without reduction in the dimension of the individual cell.

Figure 2:
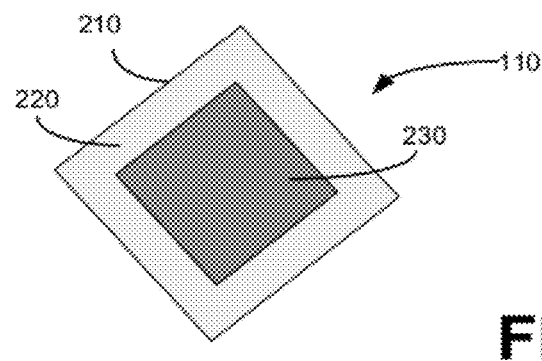
FIG. 2 illustrates example individual cells that can be structured to have holed or dummied interior portions, according to one or more embodiments.

FIG. 2 illustrates a representative individual cell of a touch-panel, according to an embodiment. In FIG. 2, individual cell 110 is structured to have a holed or dummied interior portion. In more detail, the cell 110 includes a perimeter edge 210, and a perimeter thickness 220 that is comprised of conductive material. The perimeter thickness 220 provides sufficient conductivity to enable the particular sensor cell to either carry a signal (as a driver cell), or to carry a parasitic signal as a receiver cell. An interior portion 230 of the cell 110 is formed such that it is not conductive or electrically active. The presence of interior portion 230 reduces the overall conductive surface area of the individual cell 110. In turn, this reduces the undesirable effect of increased capacitance $C_f$ when human skin is present. At the same time, the driver and receiver cells are sufficiently close to provide reasonable mutual capacitance amongst the adjacent cells. The mutual capacitance enables the disruption caused by the user's finger to be measurable by the display hardware 120. More specifically, the mutual capacitance amongst adjacent cells ensures that the level of the baseline signal will be sufficiently disrupted to an event such as human skin contact, so that the contact event will be detected by the display hardware 120.

FIG. 3A and FIG. 3B illustrate (not to scale) the affects of capacitance from human contact on adjacent transmitter/detector cells of a touch screen that is structured in accordance with embodiments described herein. A touch screen includes an array of adjacent transmitter cells 312 and detector cells 314. The transmitter cells 312 are tied to a driver source which can be provided as part of the display hardware 120 (see FIG. 1), In FIG. 3A, without the presence of the finger (or other capacitive element), mutual capacitance between the adjacent transmitter and detector cells 312, 314 enables generation of a parasitic signal on the detector cell 314 (which is detected from the display hardware 120 (FIG. 1)).

As mentioned, when the finger is introduced, the finger should draw sufficient charge $C_t$ from the cells to reduce the mutual capacitance between the adjacent cells 312, 314. The resulting reduction in the parasitic signal is detected on the detector cell 314, and the presence of the finger at or near the adjacent cells is identified.

However, in certain circumstances, the finger can charge $C_f$ into the circuit to increase the parasitic signal, thus making the finger undetected. In particular, the presence of $C_f$ (unwanted charge introduction) increases when the user's contact with the device of the touch-screen is not adequately grounded. Body circuit 330 is a simplified circuit of the human body interacting with a device on which a touch-screen display such as shown and described is depicted. The body circuit 330 includes charge/capacitance contribution that includes body capacitance 332 and environment (or earth) capacitance 334. If the user is grounded directly to the display grid with a high enough capacitance, then the body circuit 330 makes negligible or no charge contribution to the finger.

If, however, the user is not grounded, then the direct and indirect capacitances 332, 334 are too small to draw the charge away from $C_m$, which can result in charge being distributed to the detector cell 314 as $C_f$ and $C_t$.

For example, in the grounded position, the user may be properly seated and may maintain a hand grip on the device. In this position, the finger draws the adequate amount of charge from the cells 312, 314, thus reducing the mutual capacitance between the cells and further reducing the parasitic signal on the detector cell.

In the ungrounded position, on the other hand, the user may have, for example, a loose hold on the device, or be interacting with the display screen without holding the device (e.g. the device may rest on a table to receive finger contact). In this position, the user's finger may introduce charge $C_f$ and $C_t$ without drawing the charge $C_m$. The signal on the detector cell 314 may then not decrease sufficiently to be detectable to the device hardware 120 (see FIG. 1).

Figure 4A:
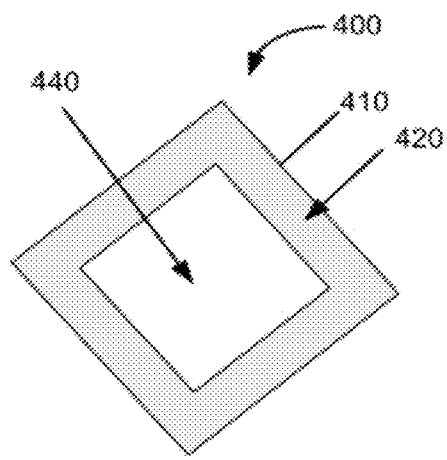
FIG. 4A illustrates an example embodiment of a sensor cell such as described with an embodiment of FIG. 1 and FIG. 2.

FIG. 4A illustrates an embodiment of a sensor cell such as described with an embodiment of FIG. 1 and FIG. 2. The individual cells 400 include a perimeter edge 410, and a perimeter thickness 420 that is formed from conductive material. The conductive material of the perimeter thickness 420 enables the particular sensor cell to either carry a signal (as a driver cell) or to carry a parasitic signal as a receiver cell. In an embodiment of FIG. 4A, the interior portion of the cell 400 is a void 440. A void, as used herein, is a non-conductive or electrically inactive region within the interior portion of a cell. As such, the interior portion 440 is not conductive or electrically active, thus reducing the overall area of the cell that is conductive/electrically active. The presence of void 440 in the interior portion reduces the overall conductive area of the cell 400. As a result, the ability of finger contact to introduce charge to the cell 400 is diminished. Cells 400 can be similarly dimensioned and positioned adjacent to one another so that mutual capacitance exists amongst the adjacent cells. The mutual capacitance ensures that the level of the baseline signal is sufficiently disrupted by human contact. The reduced conduction area of the cells, however, ensure that charge introduced by the capacitance of skin does not adversely affect the ability of the display hardware to detect the disruption in the baseline signal.

Figure 4B:
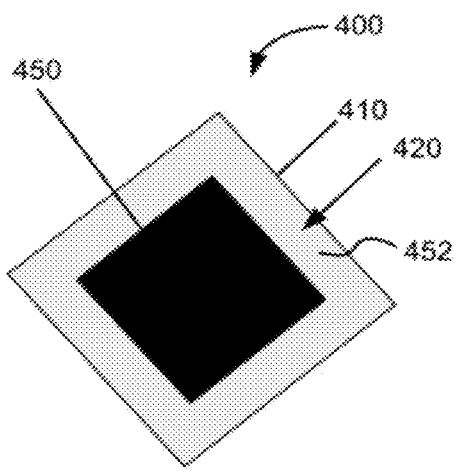
FIG. 4B illustrates another example embodiment of a sensor cell such as described with an embodiment of FIG. 1 and FIG. 2.

FIG. 4B illustrates another embodiment of a sensor cell such as described with an embodiment of FIG. 1 and FIG. 2. As with an embodiment of FIG. 4A, sensor cell 400 includes the perimeter edge 410, and the perimeter thickness 420 that is from conductive material. The conductive material of the perimeter thickness 420 enables the particular sensor cell to either carry a signal (as a driver cell) or to carry a parasitic signal as a receiver cell. The interior portion of the sensor cell is a dummy region 450. The dummy region 450 is not conductive or electrically active (in relation to the remainder of the cell). For example, the dummy region 450 can be formed from non-conductive material.

Figure 4C:
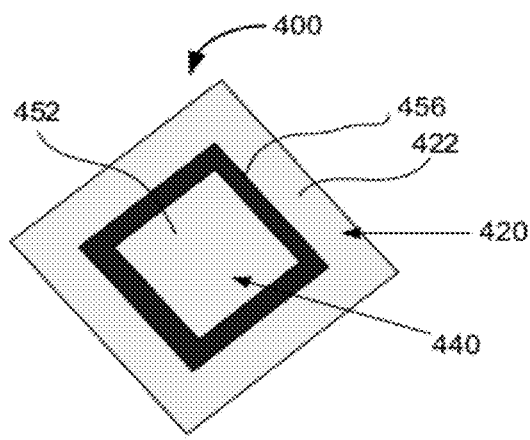
FIG. 4C illustrates a variation in which the individual sensor cells include an interior electrical break that separates conductive material within the cell, under an alternative or variation.

FIG. 4C illustrates a variation in which the individual sensor cells include an interior electrical break that separates conductive material within the cell, under an alternative or variation. More specifically, FIG. 4C illustrates the sensor cell being structured so that the dummy region 440 can include conductive material 452 (e.g. same conductive material as perimeter thickness) that is separated from conductive material 422 of the perimeter thickness 420 by a break 456. For example, the break 456 may be formed by a void or a line of non-conductive material that separates conductive material 452 of the interior portion from that of the perimeter thickness 422.

In a variation to an embodiment of FIG. 4C, the conductive material 452 of the interior portion is grounded. In particular, the conductive material 452 of the interior portion may be grounded to the grounding plane of the touch-screen. The presence of such a ground element in the individual cells makes the human body and finger a better connector to ground, thus reducing unwanted charge $C_f$ from the finger.

Figure 5:
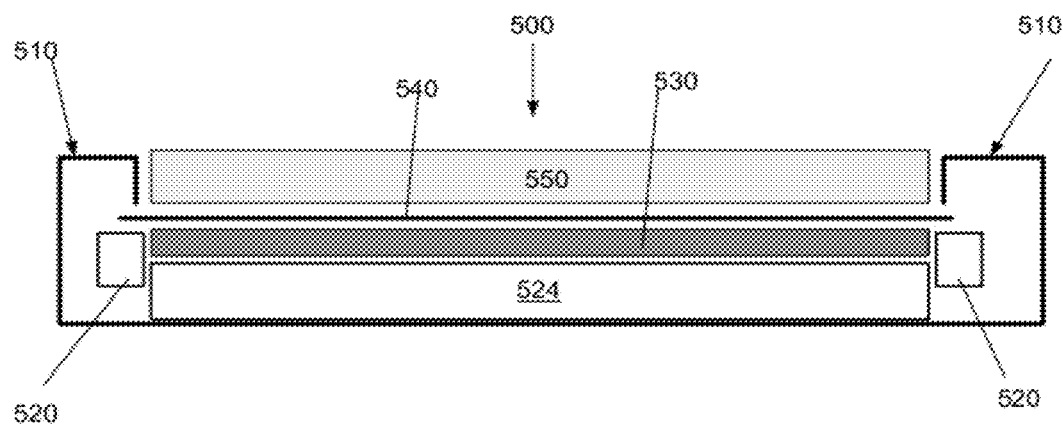
FIG. 5 illustrates an example computing device that incorporates a touch-screen display assembly such as shown and described by various embodiments.

FIG. 5 illustrates a computing device that incorporates a touch-screen display assembly such as shown and described by various embodiments. In an embodiment, the computing device 500 may correspond to, for example, a mobile computing device, such as a cellular telephony/messaging device, portable media player, camera or video camcorder, or combination mufti-functional or purpose device. As another example, the computing device 500 may alternatively correspond to a portable device, such as a netbook, ultracompact computer, slate device or other display-dominant computing device. The computing device 500 includes a housing 510, in which display hardware 520 and device electronics 524 are provided. The device electronics 524 can include the motherboard of the device, including the processing resources, the memory resources, battery and other circuitry/components for operating the computing device.

The display assembly of the device includes a display element 530 and a touch-screen panel 540. The display element 530 may correspond to any component that illuminates computer-generated content. For example, the display element 530 may correspond to a Liquid Crystal Display (LCD), organic Liquid Crystal Display (OLED) or Light Emitting Diode (LED) display. The touch-screen panel 540 comprising an array of cells such as shown and described with other embodiments. Thus, the cells of the touch-screen panel 540 may be structured to include transmitter cells and detector cells, on a grid (e.g. column/row) as described with an embodiment of FIG. 1 and elsewhere in this document. In one implementation, the touch-screen panel 540 is mounted over the display element 530. A lens 550 may be positioned over the touch-screen panel 540. The lens may be sufficiently thin to enable the finger to affect the charge carried by individual cells of the touch-screen panel 540.

Embodiments described herein include individual elements and concepts described herein, independently of other concepts, ideas or systems, as well as combinations of elements recited anywhere in this application. Although illustrative embodiments of the invention have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

What is claimed is:

1. A display assembly for a computing device, the display assembly comprising:
   a touch-sensitive panel comprising an array of sensor cells, the array of sensor cells including a first portion of sensor cells that are designated as driver cells, and a second portion of sensor cells that are designated as receiver cells;
   display hardware that is connected to the panel, the display hardware being structured to (i) actively drive a signal on each driver cell; and (ii) detect, on each receiver cell, a parasitic signal that is generated from the signal driven by one or more driver cells that are adjacent to that receiver cell;
   wherein at least some of the sensor cells are constructed to include a conductive perimeter thickness that surrounds a non-electrically active interior portion.

2. The display assembly of claim 1, wherein individual sensor cells in the array of sensor cells are diamond shaped.

3. The display assembly of claim 1, wherein individual sensor cells in the array of sensor cells are polygonal in shape.

4. The display assembly of claim 1, wherein the non-electrically active interior portion of the at least some of the sensor cells is a void.

5. The display assembly of claim 1, wherein the non-electrically active interior portion of the at least some of the sensor cells is formed from non-conductive material.

6. The display assembly of claim 1, wherein the non-electrically active interior portion of the at least some of the sensor cells is comprised of a break that separates the conductive perimeter thickness from the interior portion of that sensor cell.

7. The display assembly of claim 6, wherein the non-electrically active interior portion of individual sensor cells that include the break is grounded.

8. The display assembly of claim 1, wherein the array of sensor cells is structured to provide the driver cells on one of a row or a column of the array, and the receiver cells on the other of the row or the column of the array.

9. A computing device comprising:
a housing;
a display assembly comprising:
- a touch-sensitive panel comprising an array of sensor cells, the array of sensor cells including a first portion of sensor cells that are designated as driver cells, and a second portion of sensor cells that are designated as receiver cells;
- display hardware that is connected to the panel, the display hardware being structured to (i) actively drive a signal on each driver cell; and (ii) detect, on each receiver cell, a parasitic signal that is generated from the signal driven by one or more driver cells that are adjacent to that receiver cell;
- wherein at least some of the sensor cells are constructed to include a conductive perimeter thickness that surrounds a non-electrically active interior portion.

10. The computing device of claim 9, wherein individual sensor cells in the array of sensor cells are diamond shaped.

11. The computing device of claim 9, wherein individual sensor cells in the array of sensor cells are polygonal in shape.

12. The computing device of claim 9, wherein the non-electrically active interior portion of the at least some of the sensor cells is a void.

13. The computing device of claim 9, wherein the non-electrically active interior portion of the at least some of the sensor cells is formed from non-conductive material.

14. The computing device of claim 9, wherein the non-electrically active interior portion of the at least some of the sensor cells is comprised of a break that separates the conductive perimeter thickness from the interior portion of that sensor cell.

15. The computing device of claim 14, wherein the non-electrically active interior portion of individual sensor cells that include the break is grounded.

16. The computing device of claim 9, wherein the array of sensor cells is structured to provide the driver cells on one of a row or a column of the array, and the receiver cells on the other of the row or the column of the array.

17. The computing device of claim 9, wherein the display assembly further comprises a display element that emits computer-generated content.

18. The computing device of claim 9, wherein the computing device is a mobile computing device.

19. The computing device of claim 9, wherein the computing device is a slate of display-dominant device.

20. A touch-sensitive panel comprising:
an array of sensor cells, the array of sensor cells including a first portion of sensor cells that are designated as driver cells, and a second portion of sensor cells that are designated as receiver cells;
wherein the array of sensor cells are arranged to (i) actively drive a signal on each driver cell; and (ii) detect, on each receiver cell, a parasitic signal that is generated from the signal driven by one or more driver cells that are adjacent to that receiver cell;
wherein at least some of the driver cells and/or the receiver cells are constructed to include a conductive perimeter thickness that surrounds a non-electrically active interior portion.

* * * * *